United States Patent [19]

Van Nes et al.

[11] Patent Number: 4,959,864
[45] Date of Patent: Sep. 25, 1990

[54] METHOD AND SYSTEM FOR PROVIDING ADAPTIVE INTERACTIVE COMMAND RESPONSE

[75] Inventors: Floris L. Van Nes; Frederik F. Leopold, both of Eindhoven; Frederik J. Schäffers, Hilversum, all of Netherlands

[73] Assignee: U.S. Philips Corporation, New York, N.Y.

[21] Appl. No.: 409,996

[22] Filed: Sep. 19, 1989

Related U.S. Application Data

[63] Continuation of Ser. No. 825,836, Feb. 4, 1986, abandoned.

[30] Foreign Application Priority Data

Feb. 7, 1985 [NL] Netherlands ............... 8500339

[51] Int. Cl.$^5$ .............................................. G10L 7/08
[52] U.S. Cl. ........................................................ 381/43
[58] Field of Search .................................. 381/41–46, 381/51–53, 110; 367/198; 364/513.5

[56] References Cited

U.S. PATENT DOCUMENTS

| | | | |
|---|---|---|---|
| 3,470,321 | 9/1969 | Dersch | 381/43 |
| 4,277,644 | 7/1981 | Levinson et al. | 364/513.5 |
| 4,513,189 | 4/1985 | Ueda et al. | 381/110 |
| 4,520,576 | 6/1985 | Vander Molen | 367/198 |
| 4,624,008 | 11/1986 | Vensko et al. | 364/513.5 |

FOREIGN PATENT DOCUMENTS

8401863 1/1986 Netherlands .

OTHER PUBLICATIONS

Skikano et al., "A Linguistic Processor in a Conversational Speech Recognition System", Rev. Elec. Comm. Labs, vol. 26, No. 11–12, Nov.–Dec. 1978, pp. 1505–1520.

Levinson et al., "A Conversational-Mode Airline Information and Reservation System Using Speech Input and Output", The Bell System Technical Journal, vol. 59, No. 1, Jan. 1980, pp. 119–137.

Flanagan, "Computers That Talk and Listen: Man-Machine Communication by Voice", IEEE Proceedings, Apr. 1976, pp. 405–415.

Rabiner et al., "Application of Isolated Word Recognition to a Voice Controlled Repertory Dialer System", 1980 IEEE-ICASSP, pp. 182–185.

Primary Examiner—Gary V. Harkcom
Assistant Examiner—John A. Merecki
Attorney, Agent, or Firm—Leroy Eason

[57] ABSTRACT

A method and system for providing adaptive interactive command response to a user, in which the user may protest upon incorrect recognition by the system of a command given by the user in response to question from the system. If the number of such protests reaches a value which exceeds a predetermined level of at least two protests, the decision model used for command recognition by the system is adjusted so that during a certain time interval (T) thereafter a more explicit indication is given to the user concerning one or more of the commands which are recognized. In the normal case, when such threshold value is not exceeded, no indication is given to the user of commands which have been recognized and the system proceeds directly to the next question.

11 Claims, 7 Drawing Sheets

METHOD AND SYSTEM FOR PROVIDING ADAPTIVE INTERACTIVE COMMAND RESPONSE

This is a continuation of application Ser. No. 06/825,836, filed Feb. 4, 1986, now abandoned. Priority of application Ser. No. 8,500,339, filed on Feb. 7, 1985 in The Netherlands, is claimed under 35 U.S.C. 119.

BACKGROUND OF THE INVENTION

1. Field of the Invention

The invention relates to a method for the recognition of a command supplied to an interactive system by a user of the system, in which in one section of a program
(a) the system asks the user of the system a question in the form of a speech signal,
(b) next, a command recognition unit is switched on for recognition of a command to be supplied to the system by the user,
(c) depending on the result of the recognition procedure in step (b), and on the basis of a decision model, the system makes a choice of one reaction from a group of at least two possible reactions to the command, and
(d) next, this reaction is then presented to the user by the system.

2. Description of the Related Art

The invention also relates to an interactive system for the implementation of the method.

An example of the method of the type mentioned in the preamble is shown in FIG. 1. The method could, for example, be implemented in an automatic ticket issuing machine for obtaining train or bus tickets, with the mutual transfer of information taking place by means of the spoken word. The method begins at block 10 and runs to block 11 in which step (a) is carried out, that is to say, the system asks the user/buyer the first question, for example:

question 1: "Do you want to buy a train ticket or a bus ticket?" In addition, step (b) is then carried out: the command recognition unit is switched on. After that, the user gives his first command in block 12 (or in other words: his first answer), for example:

command 1: "(I want) a train ticket".

The decision model is indicated with block 13. The decision model chosen is very simple. It can only select from two reactions. One reaction is that the program runs back via the circuit 14 and the block 15 to block 11. This path is chosen if the command recognition unit has not recognized the command which was given. In block 15 the system then gives, for example, the following information:

"Your command was not recognized. I shall repeat the question."

If a command is in fact recognized (and let us assume for a moment that the command has also been recognized correctly, namely the command that the user has also given—which need not necessarily be the case!) then the program runs to block 16, in which the next question is asked by the system, for example:

question 2: "What is your destination?" To which the user could, for example, answer in block 17:

command 2: "Amsterdam".

Next the decision procedure in block 13' again takes place, which can lead to the program running via the circuit 14' and the block 15'—in which the same information as in block 15 is given to the user, namely that the command has not been recognized—to block 16 for the repetition of the question. When a command is recognized the program runs to block 18 for the third question:

question 3: "What station do you want to go to?" Which in block 19 could be followed by:

command 3: "Amstel station". The fourth question might be:

question 4: "Do you want to travel first or second class?" To which the answer in block 21 is, for example:

command 4: "Second class".

The blocks 13" and 13"' again indicate the decision phases and 14" or 14"' and 15" or 15"', respectively, indicate the circuits that are gone through if no command is recognized.

In block 22 the system indicates the price of the ticket.

In block 23 the buyer pays, so that in block 24 he receives his ticket, after which the program stops in block 25.

In FIG. 1 the program sections 26, 26', 26", . . . etc. are indicated with the dashed lines. The program sections 26 and 26' have block 16 in common. The program sections 26' and 26" have block 18 in common, . . . etc.

It should be mentioned here that program sections may also contain larger units than the units 26, 26'. . . .

The method shown in FIG. 1 has a great advantage. If the recognition is correct in all sections of the program, then the user very quickly obtains a ticket. This is because the system asks a following question immediately after recognizing a command and does not first give further information to the user relating to the command which it has recognized.

The method shown in FIG. 1 also has a number of disadvantages. For instance, it may occasionally happen that the user discovers only when he or she arrives at program section 26"' that in an earlier section of the program the system has recognized a different command from the one he or she gave, so that the user is now in a completely different branch of the dialogue. For example, he/she wanted to buy a bus ticket and only found out in program section 26"' that he/she was in the dialogue for obtaining a train ticket.

Another disadvantage is that because of its simplicity the system is fairly rigid. A command is either accepted or it is not. In the latter case the question is always repeated, which can be very annoying.

Yet another disadvantage lies in the fact that in changing circumstances during the command recognition, particularly for example in those cases where the conversation between a user and the system takes place via the public telephone network—the transfer (path) from the mouth of the speaker/user to the input of the system changes in terms of time—the system cannot adjust its reactions to these changing circumstances.

SUMAMRY OF THE INVENTION

The purpose of the invention is now to provide a method or a system that functions better, is better adapted to the user and can adapt to changing circumstances, while maintaining the advantages of the known methods or systems. For this purpose the method according to the invention is characterized in that the user presents protests to the system, as a result of the fact that a command has been recognized wrongly by the system, add the number of protests is counted for the relevant program section and possibly earlier program sections. If the number of protests exceeds a certain threshold value the decision model is adjusted at least during a certain time interval in such a way that in step (c), if a command is recognized, in at least a number of the cases the decision model chooses a reaction in the form of a more explicit indication for the user of the command that has been recognized by the command recognition unit.

The invention is based on the realization that the system should be adaptive and in its reactions to the user should be able to adapt itself, on the one hand to the user and, on the other hand, to changing circumstances (for example in the transmission path between user and system).

The adaptation to the user can, for example, be necessary because the latter speaks fairly unclearly, while the system nevertheless recognizes a command—and hence a wrong command. In most cases, after the system has asked the next question, the user will start to protest. If this happens frequently the system must, for example, build in an extra check in the dialogue. Also in the event of the transmission (path) between the user and the system being poor, the system will often make a mistake in recognition which likewise leads to protests on the part of the user. Now, by counting the number of protests and, if the number of protests exceeds the above-mentioned value, by adjusting the decision model in such a way that a during a certain time interval a more explicit indication of the command which has been recognized is given to the user, the user acquires a better possibility of checking with regard to the command recognized by the system.

The user then notices more quickly if something goes wrong or threatens to go wrong. On the other hand, if it turns out after the above-mentioned time interval that the circumstances with regard to recognition have improved, it is possible to switch over again to a less explicit indication, for example no further indication, as in the method shown in FIG. 1, so that the program again runs faster there and consequently the user does not become irritated (or does so less quickly).

The above-mentioned time interval may, for example, be a fixed time interval. For instance, for two minutes after the number of protests has exceeded the threshold value the system will give a more explicit indication of the command which it has recognized. After the two minutes the system then returns to the original decision model. It is also possible for the system to return to the original decision model when, after subsequent questions from the system, for example, correct recognition has taken place twice without any protest from the user. In this case the time interval is therefore related to the time within which the system and the user have dealt with the next (two) questions. The time interval here is therefore not fixed.

The said value which must be exceeded in order to change the decision model can be chosen at random. This value will, of course, be larger than or equal to two. If the value is greater than two the aim will again be not to choose it too large in order to prevent it taking too long (too many protests being needed) to change the decision model. A suitable value may lie between two and, for example, five. Yet another possibility is for the more explicit indication to be given by the system only within one program section (or one or more consecutive program sections). The time interval then depends on the duration of the program section(s).

In accordance with the method according to the invention, starting from the decision model and depending on whether the protest score of a command recognized by the command recognition unit exceeds a certain threshold value or not, the system can make a choice between a first and a second reaction in step (c). In the first reaction the system asks the user a following question immediately after recognition of the previous command. In the second reaction the system gives the user initial information about the command which the command recognition unit has recognized. The method is characterized in that when the number of user protests reaches a value at which it exceeds the said threshold value, the threshold value is increased at least during the aforesaid time interval.

In favorable recognition circumstances, at a score that lies just above the threshold value the first reaction will be continued, a following question being given immediately after recognition, until the score reaches a raised threshold value at which the second reaction will be provided. However, in deteriorating circumstances, when the score reaches the first threshold value the system will immediately provide the second reaction in which it gives initial information about the command which was recognized by the system. In this way an extra check is built in, which is necessary in the case of deteriorating circumstances.

It should, however, be mentioned here that for commands which have been recognized with a score below the original threshold value, and for commands recognized with a score above the raised threshold value there is no change in the reaction of the system in deteriorating circumstances. It is only in a number of cases that the reaction of the system changes depending on whether there are deteriorating circumstances, namely in those cases where the score of the command which has been recognized lies between the original threshold value and the raised threshold value. It is therefore only in those cases that a more explicit indication of the command which has been recognized is supplied to the user only if there are deteriorating circumstances.

The method can also be characterized in that if the number of protests exceeds the said threshold value, then during the time interval the system always reacts by giving the user information about the command which the command recognition unit has recognized. This method can be applied, for example, in a system as described above in which, before the number of protests has exceeded the said value and depending on the question of whether the score exceeds a certain threshold value or not, the system can make a choice from the first reaction (after recognition the next question is given immediately) or the second reaction (after recognition, initial information is given about the recognized command). After the number of protests has exceeded the said value the system then switches over to only the second reaction as a reaction to a command which has been recognized. Thus, after recognition of a command, there is a change in the reaction of the system only for those cases for which the protest score of the command which has been recognized lies above the above-mentioned threshold value.

The method can also be applied in a system in which, before the number of protests has exceeded the said value, the reaction of the system involves giving the next question after recognition of a command. After the number of protests has exceeded the said value, the system, after recognition of a command, always gives the information about the command which has been recognized.

In both the latter two cases the extra check is therefore not obtained by a shifting threshold, which means that in the case of commands for which the scores are above the shifted threshold a still further check cannot, or will not, take place. In the previously described cases an (extra) check exists for all commands during the time interval. If a command has been wrongly recognized then the user protests, as a result of which the question can then be repeated.

Another possibility is that the system, in reaction to the user, asks the question as to whether the command recognized by the command recognition unit is also the command given by the user. In this case, the command recognition unit can then be further equipped for the recognition of a following affirmative or negative answer from the user. In response to a negative answer from the user the system can then repeat the original question.

A further refinement of the method can be obtained by extending the time interval if, within such time interval, a number of protests are again counted such that the said threshold value is exceeded. The extension can be made in such a way that after the said value is exceeded within the current time interval, the time interval starts running again from the moment at which the threshold value again was exceeded.

An interactive system for carrying out the method according to the invention, is equipped with an activation unit for asking the user of the system a question in the form of speech, a command recognition unit for the recognition of a command supplied to the system by the user and containing a decision unit, and a command status unit in the activation unit coupled to the command recognition unit for delivering to the user one reaction from a group of at least two possible reactions, depending on the decision model in the decision unit. Such system is characterized in that it is further equipped with:

a protest recognition unit for the recognition of a protest supplied to the system by the user if a command is wrongly recognized, a counter coupled to the protest recognition unit for counting the number of protests supplied during a relevant section of the method program and, if applicable, previous sections of the program, and a comparison circuit coupled to the counter for comparing the number of protests with a threshold value, and for producing a control signal if the number of protests exceeds this value. The control signal is supplied to the decision unit, which is equipped for adjusting the decision model, at least during the above-mentioned time interval after receiving the control signal, so that it causes the actuation unit to give the user a reaction in the form of a more explicit indication of the command which has been recognized by the command recognition unit.

The system can be further characterized in that the decision unit is also equipped for increasing the threshold value, at least during the time interval, after receiving the control signal. As a result, the threshold value is raised after the number of protests has exceeded the initial threshold value.

Another possibility is that the system is characterized in that the decision unit is equipped in such a way that at least during the time interval after the reception of the control signal the activation unit reacts by giving the user information about the command which the command recognition unit has recognized and in that furthermore the command recognition unit is also equipped for the recognition of an affirmative or negative answer from the user.

The system can be further characterized in that the decision unit contains a detection unit for the detection of a control signal that occurs within the time interval after the occurrence of the previous control signal, and in that the decision unit is equipped for extending the said interval after detecting the second control signal. In this way, the time interval can be extended if the said threshold value has again been exceeded.

The system, in which for the recognition of a command supplied from a group of possible commands, the command recognition unit compares the command supplied with the reference pattern of a command from the group of commands, which reference patterns are stored in a memory in the command recognition unit, can be further characterized in that, during the comparison, the sequence of the commands of which the reference patterns are compared with the command supplied corresponds to the sequence of the probabilities of the occurrence of the commands, in such a way that the reference pattern of the command with the highest possibility of occurrence is first compared with the command supplied. An acceleration of the recognition procedure is achieved in this way.

BRIEF DESCRIPTION OF THE DRAWING

The invention will be described with reference to the drawings. These show the following.

DESCRIPTION OF THE PREFERRED EMBODIMENTS

Figure 1:
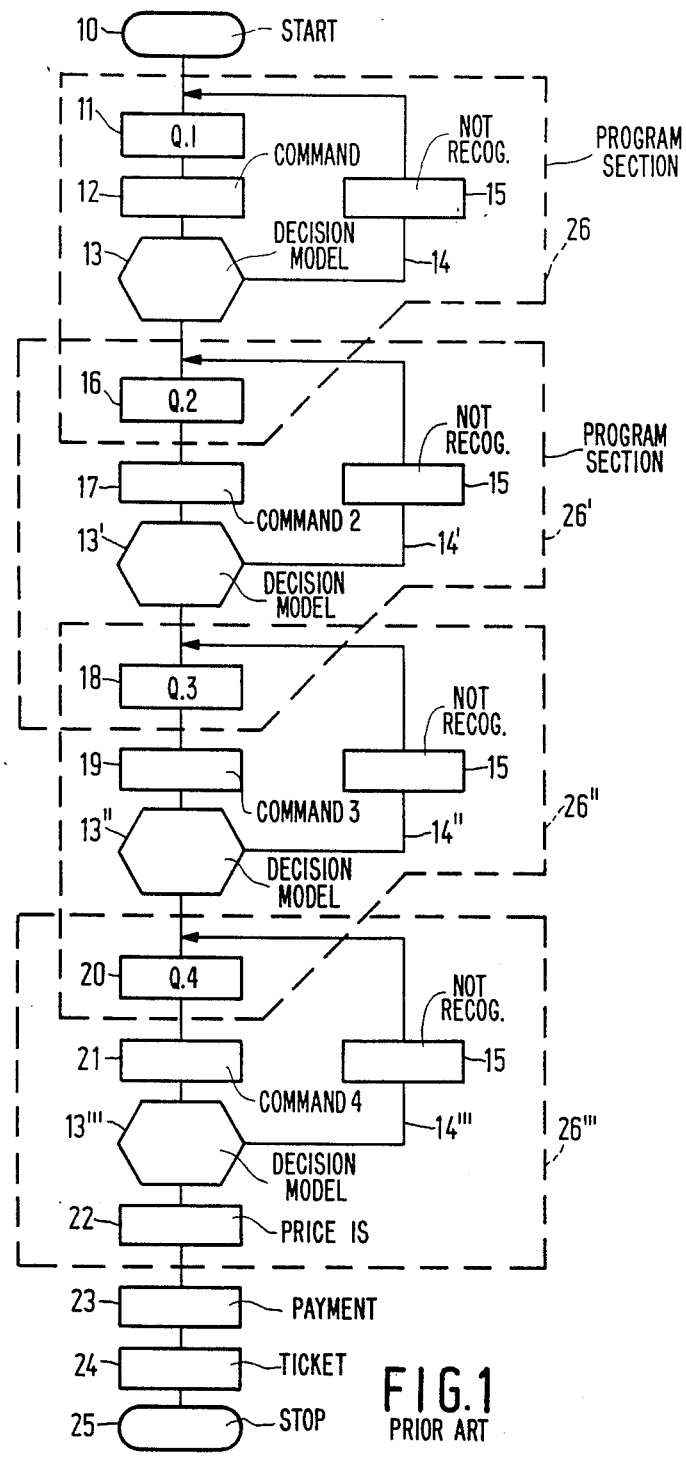
FIG. 1, the known method
Figure 2:
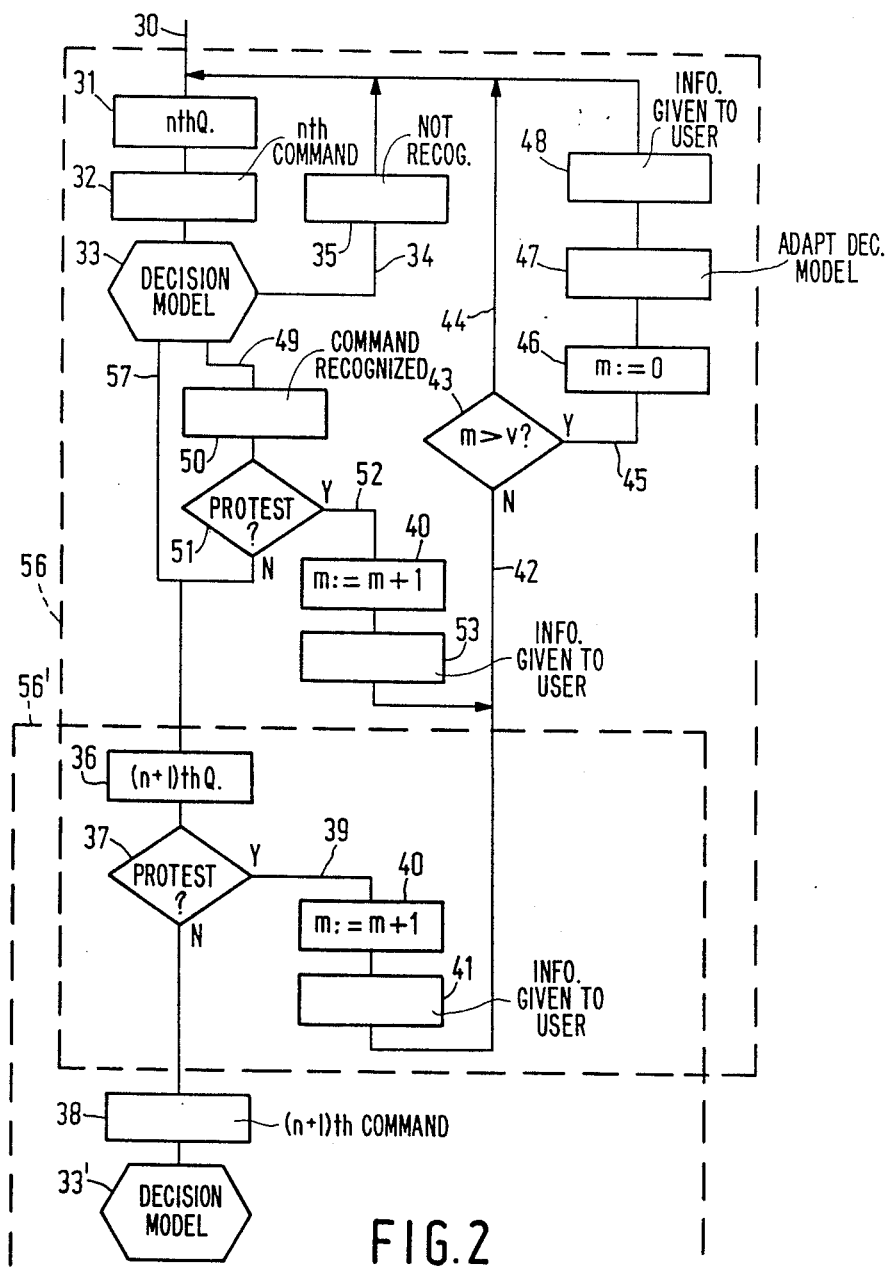
FIG. 2, a first example of an embodiment of the method in accordance with the invention, FIG. 2A, a section of the embodiment example of FIG. 2, but slightly modified, FIG. 3, a second example of an embodiment of the method, FIG. 4, two different decision models (a) and (b) on the basis of which the command recognition unit makes a choice of a reaction from a group of at least two reactions depending on the user protest score during the command recognition, FIG. 5, an example of an embodiment of an interactive system for the implementation of the method of FIG. 2, FIG. 5A, the system of FIG. 5, but slightly modified, for the implementation of the method of FIG. 2A, FIG. 6, an example of an embodiment of an interactive system for the implementation of the method of FIG. 3, and FIG. 6A, another example of an embodiment of an interactive system.

FIG. 2 shows a first embodiment of the method in accordance with the invention. FIG. 2 shows a section of the method program, such as, for example, the program section 26 in FIG. 1, but further modified with the characteristic components such as are necessary in accordance with the invention. The program runs from the line 30 to the block 31 where the nth question is asked, for example:

"Do you want to go to Amsterdam, Rotterdam or Utrecht?" The responsive nth command is given by the user in block 32, for example:

"Amsterdam".

The decision model 33 is such that, just as in FIG. 1, the program either goes back to block 31 via line 34 and block 35, because no command whatsoever can be recognized by the command recognition unit—in block 35 the system then gives the same information as the system of FIG. 1 in block 15—or after recognizing a command goes on to block 36 where the following n+1th question is asked, for example:

"Amsterdam Central Station or Amstel Station?"

If the system asks the above question at the n+1th question, while the user had given "Rotterdam" instead of the command "Amsterdam" as the command in block 32, then the recognition unit has obviously performed a faulty recognition. The user will realize this at the moment when the system asks the n+1th question since the above-mentioned stations simply are not located in Rotterdam.

At this moment the user will start protesting, block 37. The system is equipped to recognize these protests, for example because the system has a special "protest" button which the user presses at this moment, or because the system is equipped for the recognition of an acoustic protest—for example, the speaker utters the word "wrong". If no protest is recognized the program runs on via block 38 in which the n+1th command is given. If there is a protest, however, then the program runs on via the branch 39 to block 40. Here a counter is raised by the value of one. Next, the system announces in block 41:

"Your command was apparently not correctly recognized. I shall repeat the second-last question."

The program then runs via branch 42 to block 43 in which it checks whether the content m of the counter exceeds a certain value v. If not, the program then runs via branch 44 to block 31 for the repetition of the second-last question.

Now it may be that in one or more (preceding) program sections the user has uttered a protest so many times that it turns out in block 43 that m has become greater than v. In that case the program runs via block 46—in which the counter is reset to zero—to block 47—in which the decision model is adjusted in block 33—and 48—in which the system announces:

"Because of the poor recognition results, after each command you will be given an indication of which command has been recognized"—to block 31.

The decision model 33, and also the decision models (such as 33') in successive program sections, is or are now changed for at least a certain time interval, in the sense that if a command is recognized the program runs on via circuit 49 to block 50. In this block the system accounces:

"The command—Amsterdam—has been recognized" or the command which has been recognized: "Amstersdam" is itself repeated.

The user now has an earlier opportunity—namely, even before the n+1th question is asked—to protest, see block 51. If no protest follows, the program runs on to block 36. If a protest does follow, the program runs via branch 52 to block 40—in which the counter status is again raised by one, and block 53 in which the system can announce:

"Your command was apparently not correctly recognized. I shall repeat the question."

Next the program runs back via block 43 to block 31. If the time interval expires and the counter status has not again exceeded the value v in that time, the decision model then switches back to the old situation in which the program continues via branch 57 after the recognition of a command and the next question is given immediately. This switchover of the decision model can take place either with or without the counter being reset to zero. If the value v is exceeded again within the time interval the interval can be extended.

Needless to say, if the program section 56 is not the first program section in the dialogue, then a block, such as block 37, is switched between blocks 31 and 32 so that the user can protest if a command n−1 is wrongly recognized in the preceding program section and the question n−1 can be asked again.

The branch 52 need not necessarily contain counter block 40. If the branch 52 does not contain block 40 then this branch runs directly via block 53 to block 31—i.e. not via 43—to repeat the nth question.

Figure 2A:
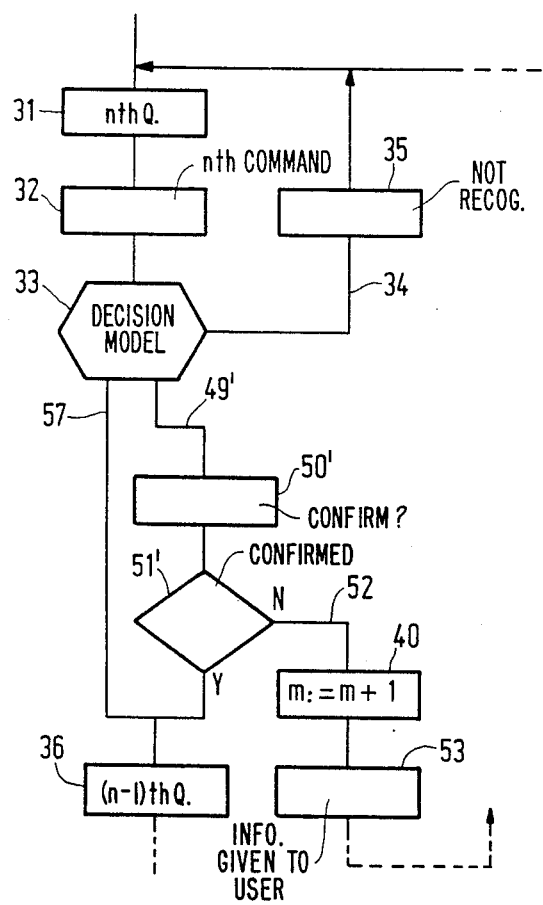

In FIG. 2A the decision model 33 operates in the same way as in FIG. 2, but has a slight change in the branch 49. In block 50' in branch 49' the system asks the user to affirm:

"Did you give Amsterdam as a command?" to which the user can reply "Yes" or "No" in 51'. If the answer is "Yes" the program then runs to block 36 for the next question from the system. If the answer is "No" the program then runs via branch 52, possibly via block 40 (if available) to block 53. A check such as this is very useful since the recognition of only two commands, namely "Yes" and "No", is very simple. Preferably, block 40 in branch 52 should not be omitted here. The answer "No" from the user in block 51' is now regarded as a protest and counted.

The time interval during which the decision model in FIGS. 2 and 2A proceeds through branch 49 or 49', respectively, after recognition, can have a fixed value. This means that after the recognition in 33, 33', 33", ... . of those commands pertaining to the questions n, n+1, n+2, ... which fall within the time interval in question, the system gives the more explicit indication in accordance with blocks 50 or 50' respectively.

Another possibility is that after the decision model switches over to the more explicit indication (branch 49 or 49', respectively), a count is made of how many subsequent commands are then correctly recognized. After, for example, three times a correct recognition of a command the system then again switches over to the reaction in accordance with branch 57 (in other words, no further indication of the command which has been recognized). In this case the time interval is related to the time during which correct recognition of three (subsequent) commands has taken place.

Yet another possibility is that the more explicit indication of the command takes place during the relevant program section 56, and possibly subsequent program sections—for example, also program section 56' (see FIG. 2). In that case the time interval is related to the length in time of the relevant program section or sections.

The value v will be chosen greater than or equal to two. On the other hand, it should not be too great in order to avoid the need to protest too many times before the decision model is to change. The point is that too many protests are annoying to a user. A suitable value for v may lie between two and, say, five.

Figure 3:
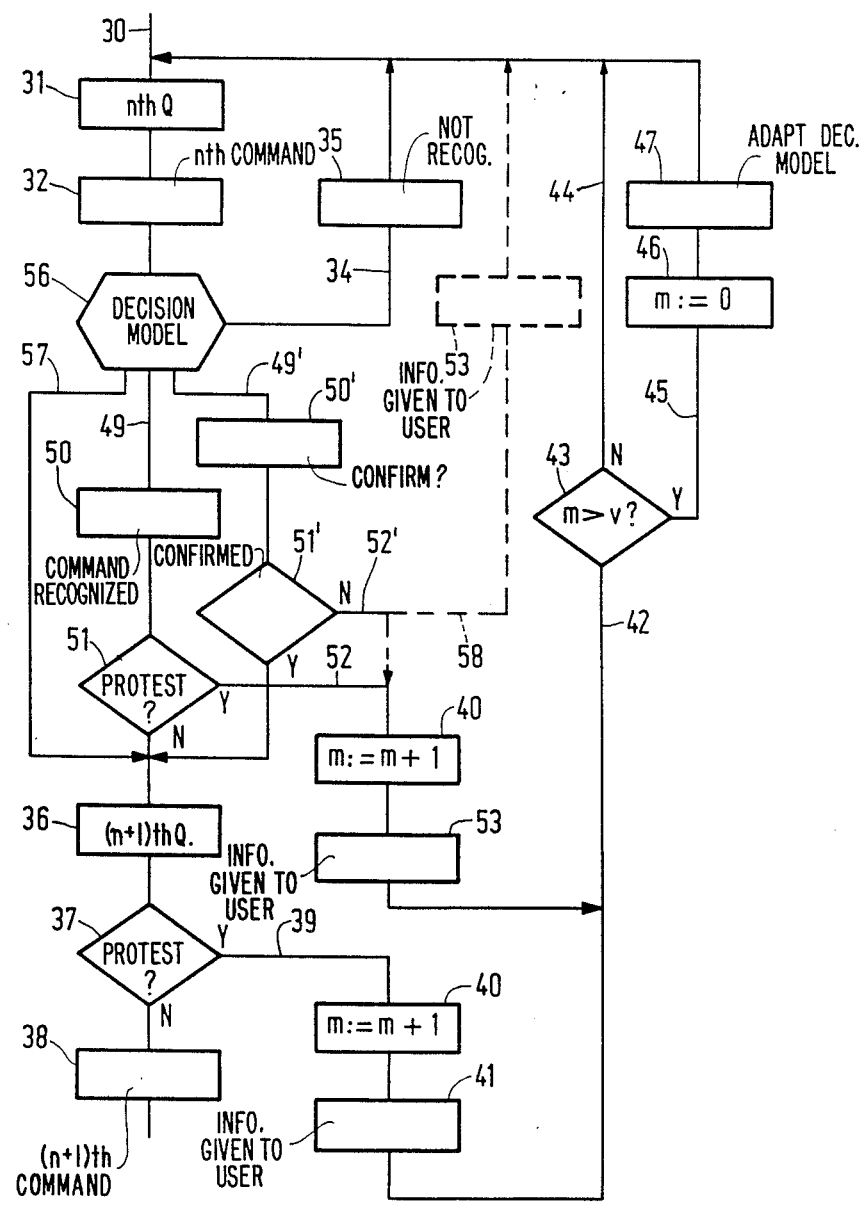

FIG. 3 shows another method in accordance with the invention. The method displays a great deal of similarity with the method in accordance with FIG. 2. The difference here is in the decision model 56 and in the fact that block 48 from FIG. 2 is omitted here. The decision model here is equipped in such a way that, depending on the score of a command which has been recognized, the system selects from a number of reactions. The first reaction is that in which the system gives the next question immediately after a recognition, see branch 57 which leads directly to block 36. The second reaction—branch 49—is that in which the system gives information about the command which has been recognized. This is in accordance with the operation of blocks 50 and 51 as already described on the basis of FIG. 2. The third reaction—branch 49'—is that in which the system reacts as described by means of blocks 50' and 51' on the basis of FIG. 2A.

It should be added here that the system need not necessarily be able to give three reactions after recognition. It is also possible, of course, for the system to select from two reactions after recognition, for example, in accordance with branch 57 or in accordance with branch 49.

Figure 4:
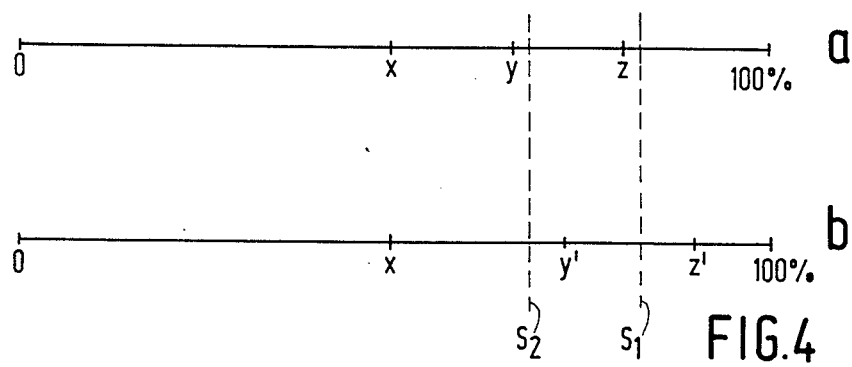

The operation of the decision model 56 is explained in greater detail on the basis of FIG. 4. It is known from speech recognition theory that a score is allocated to a recognition indicating the degree of reliability of the command which has been recognized. This score may be between 0% and 100%. A score axis is plotted in FIG. 4A. If the score falls in the interval between 0 and x % then it is decided that the command has not been recognized. If the scores for all commands fall in this range then obviously no command whatsoever has been recognized. The program then runs back via branch 34. We now assume that the command recognition unit has ultimately come to the conclusion that a particular command has been recognized. The way in which the command recognition unit has arrived at that conclusion is not important here. If the score for the command which has been recognized falls in the interval between x and y %, then the system gives the reaction in accordance with block 50'—in branch 49'—whereupon the recognition unit is again switched on for the reaction of an affirmative or a negative answer from the user.

If the score for the command which has been recognized falls in the interval between y and z %, then the program follows branch 49. If the score falls in the intervals between z % and 100% then the program follows branch 57—in other words, it is then impossible for the user to check immediately on the command which has been recognized.

The score axis is also plotted in FIG. 4b, but now for the situation in which the decision model 56 is adjusted as a consequence of the number of protests exceeding the value v. The boundaries y and z from FIG. 4a are shifted to higher score values.

For the purpose of adjustment, a command which has been recognized with a score $s_1$ will lead to a reaction of the system that runs via branch 57 and, after adjustment of the decision model, will lead to a reaction via branch 49. Similarly, a command which has been recognized with a score $s_2$ will lead to a reaction in accordance with branch 49 (before adjustment) or branch 49' (after adjustment), respectively.

If the user gives a negative answer in block 51' the program goes on via branch 52'. There are again two possibilities. Either the program runs via block 53 directly to block 31 in accordance with the branch 58 given in dashed lines, or the program runs to block 40 and then via block 53 and block 43 also returns to block 31.

The decision model 56 can also be modified in a different way in yet another example of an embodiment of the flow chart of FIG. 3. For example, it is also possible that, after the counter status m has exceeded the value v, the decision model 56 gives only a reaction in accordance with circuit 49' during the time interval, after a recognition of a command. At the end of the time interval the decision model then returns to the possible reactions in accordance with circuits 57, 49 and 49' depending on the score, as discussed on the basis of FIG. 4a.

The two decision models 56 as discussed above differ, among other things, in one important respect from the decision models 33 of FIGS. 2 and 2a.

In the decision models of FIGS. 2 and 2a the program runs during the interval in question for all the commands recognized via the path (circuit 49 or 49', respectively) of a more explicit indication of the command recognized. In the decision models 56 as described above that is not the case. In the decision model 56 as described on the basis of FIGS. 4a and b there are commands (namely those commands with a scoring percentage lying between x and y, between y' and z and between z' and 100) for which the change in the decision model to the situation of FIG. 4b as a consequence of the fact that m has exceeded the value v, has no effect on the reaction of the system.

Even if the decision model 56 changes in such a way that after recognition of a command only a reaction in accordance with circuit 49' takes place, the system's reaction to commands which are recognized with a scoring percentage lying between x and y remains the same. This is why it was stated at an earlier stage that in at least a number of the cases the system chooses a reaction in step (c) in the form of a more explicit indication of the command which has been recognized. For one example of an embodiment of the decision model 56 in FIG. 3 these are therefore the cases in which the scoring percentage of the command which has been recognized lies between y and y' and between z and z'. For the other example of an embodiment in FIG. 3 these are therefore those cases in which the scoring percentages lie between y and 100.

Figure 5:
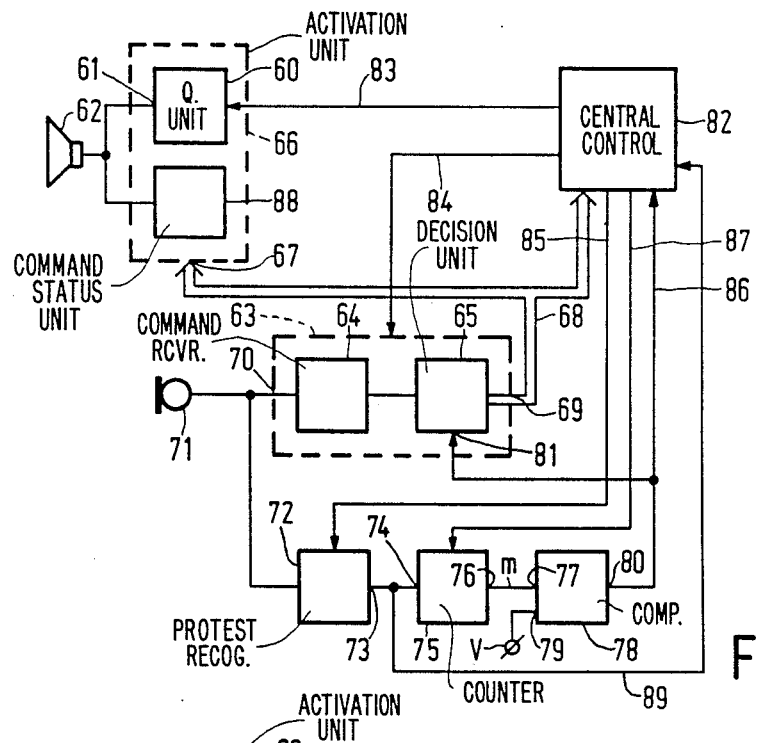

FIG. 5 shows an example of an embodiment of an interactive system for the implementation of the method in accordance with the invention. The system contains a question unit 60 for asking the user of the system a question in the form of speech. For this purpose, the output 61 of the question unit 60 is coupled to a loudspeaker 62. In addition, there is a command recognition unit 63 for the recognition of a command—in command receiver block 64—and containing a decision unit 65. An activation unit 66 has a control input 67 coupled via the line 68 to an output 69 of the command recognition unit 63. An input 70 of the command recognition unit 63 is coupled to a microphone 71.

The microphone 71 is additionally coupled to a protest recognition unit 72 for the recognition of a protest supplied to the system by the user if a command is wrongly recognized by the system. This therefore involves an acoustic protest. At the moment when a protest occurs the protest recognition unit 72 supplies a counter pulse to its output 73, which counter pulse is supplied to a count input 74 of a counter 75. The output 76 of this counter 75 is coupled to a first input 77 of a comparison circuit (comparator) 78. The value v is supplied to the second input 79. The content m of the counter 75 is supplied to the first input 77. The output 80 is coupled to a control input 81 of the decision unit 65. The comparator 78 produces a control signal as its output 80 if the value m exceeds the value v.

In addition, there is also a central control unit 82 which controls the various components of the system. For example, there is a control line 83 for driving the question unit 60. Following a control signal over this line 83 the question unit 60 will present a question to the user in the form of speech via the loudspeaker 62. There is a line 84 for next switching on the command recognition unit 63 (and later also switching it off again). There is also a control line 85 for switching on the protest recognition unit 72 at the right moment so that a protest can be recognized. There is a line 86 from the output 80 to the central control unit 82, so that the central unit knows when m exceeds the value v. A control line 87 to the counter 75 resets it to zero as soon as a signal occurs on the line 86. The line 68 is also coupled to the central unit 82.

The operation of the arrangement shown in FIG. 5 for enabling the method of FIG. 2 to be implemented is now explained as follows. If $m \leq v$ then the program shown in FIG. 2 runs from the block 33 either via the branch 57 directly to block 36 or via the branch 34 back to block 31. The decision unit 65 gives the decision that a command has been recognized or not by supplying a control signal to the activation unit 66 via the line 68. If a command has been recognized, then a new question is asked. This means that the control signal presented via the input 67 activates the question unit 60—which forms part of the activation unit 66—so that a following question is asked. If no command has been recognized then the control signal that is presented via the input 67 activates the command status unit in block 88 to cause the following to be passed on via the loudspeaker 62 (block 35 in FIG. 2):

"Your command has not been recognized. I shall repeat the question."

Next, the question is repeated by the question unit 60 (see block 31 in FIG. 2). This can, for example, be achieved because the control signal on the line 68 is also supplied to the central unit 82 and if a command is not recognized then the question unit 60 is activated to repeat the question via the line 83.

If the content m of the counter exceeds the value v at a given moment, then a control signal is supplied by comparator 78 to the decision unit 65, as a result of which the decision model is changed.

If no command is recognized nothing changes in the process described above. Something only changes if a command is in fact recognized. In that case another control signal appears on the line 68 which causes the activation unit 66—and in particular the command status unit in block 88—to produce the reaction (see also block 50 in FIG. 2):

"The command—. . . —has been recognized."

Next the central unit 82 switches on the protest recognition unit 72 for the detection of a possible protest (see block 51 in FIG. 2). If a protest is detected by the unit 72 then the counter status m of the counter 75 goes up by one (see block 40 in circuit 52 in FIG. 2). In addition, this fact is passed on via line 89 to the central unit 82 which then activates the activation unit 60 via the line 83 to repeat the question. The fact that in FIG. 2 other additional information in blocks 41, 53 and 48 is passed on to the user is further disregarded here since it is not relevant for the understanding of the method or the system.

If no protest is detected then via the line 83 the instruction is given by the central unit 82 to the activation unit 60 to ask the next question and pass it on to the user. After the next question is asked the unit 72 for the recognition of a possible protest (see block 37 in FIG. 2) and the command recognition unit 63 for the recognition of the next command (see block 38 in FIG. 2) are switched on (either simultaneously or one after the other). This completes the description of how the system in FIG. 5 performs the process shown in FIG. 2.

Figure 5A:
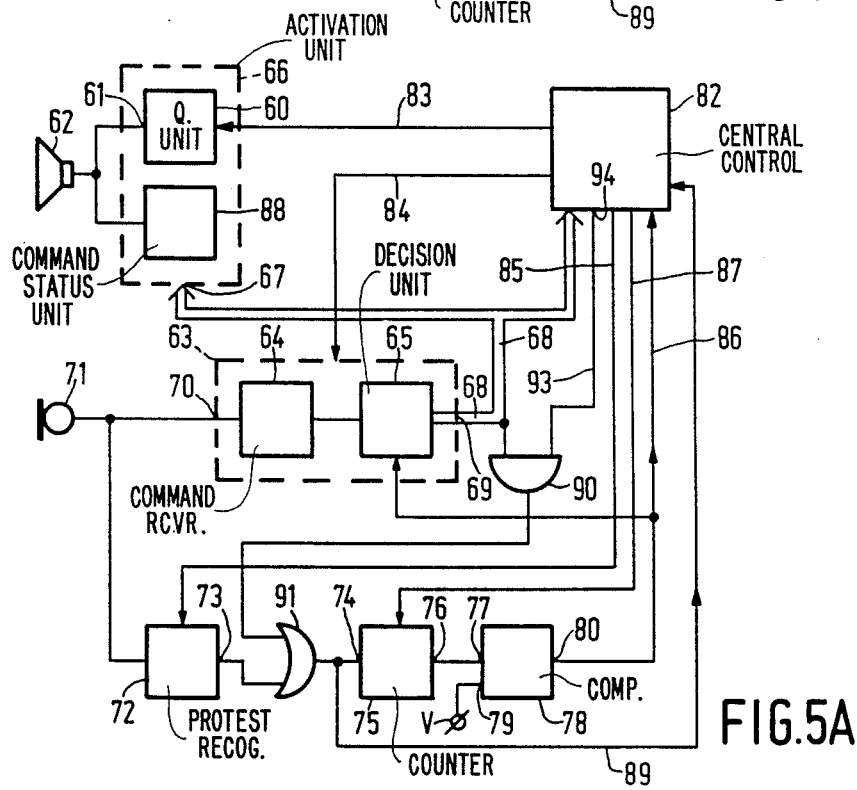

The circuit in FIG. 5 can also be modified in such a way that the method shown in FIG. 2A is realized. For this purpose, some extra elements are needed, as shown in FIG. 5A.

In FIG. 2A, after the change in the decision model, the branch 49' is gone through when a command is recognized. In that case, in FIG. 5A a control signal appears on line 68 which activates the activation unit 66—and in particular the command status unit in block 88—to produce the reaction (see block 50' in FIG. 2A):

"Did you give—. . . —as a command?"

Next, the central control unit 82 switches on the command recognition unit 63 for the detection and recognition of an affirmative or negative answer from the user (see block 51' in FIG. 2A). If a negative answer is detected by the command recognition unit 63, then the counter status m of the counter 75 goes up by one (see block 40 in branch 52 in FIG. 2A). In FIG. 5A this is achieved because line 68 is also coupled to the counter input 74 of the counter 75 via an additional AND gate 90 and an OR gate 91. The output 73 of the protest recognition unit 72 is, of course, also coupled via the OR gate 91 to the counter input 74 of the counter 75. The second input of the AND gate 90 is coupled via the line 93 to an output 94 of the central unit 82. It is only after the occurrence of the reaction in accordance with block 50' in FIG. 2A that the output 94 becomes "high" so that the recognition of a negative answer delivers a counter pulse which is allowed to pass through since the AND gate 90 does not block this counter pulse. This completes the description of how the system in FIG. 5A performs the process shown in FIG. 2A.

Figure 6:
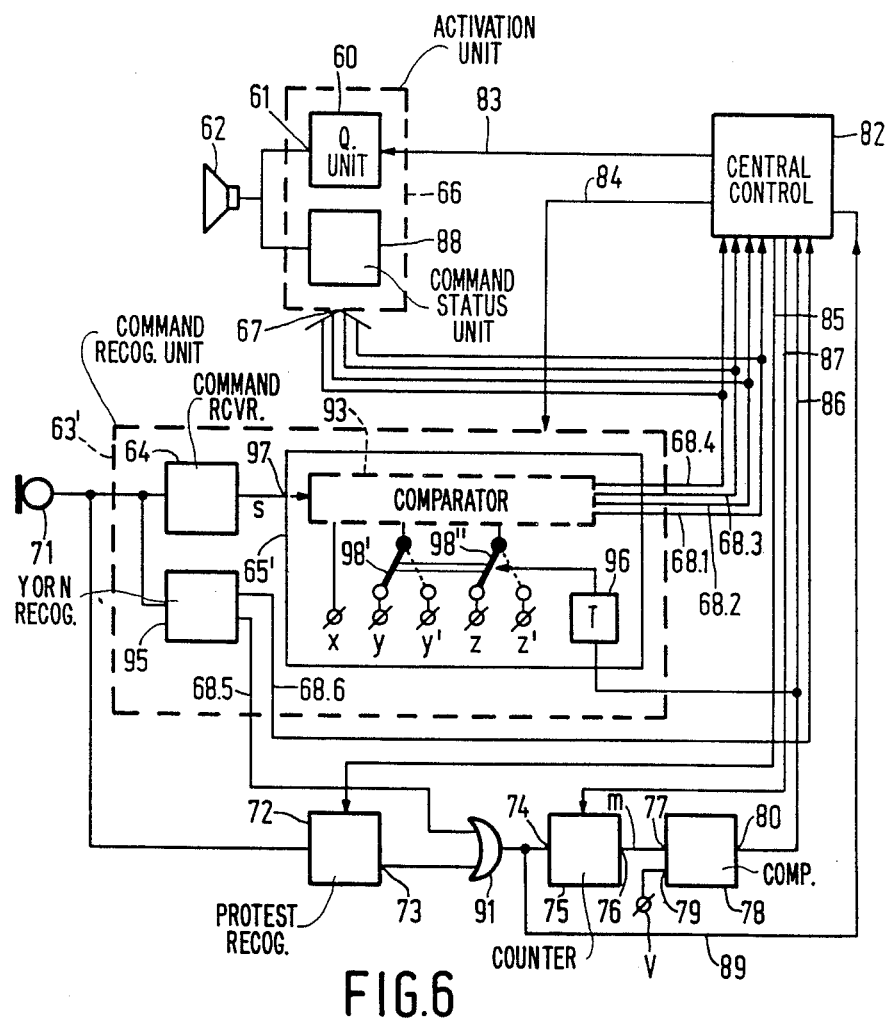

FIG. 6 shows an interactive system for performing the method shown in FIG. 3. The decision model in the decision unit 65' is now worked out further. The decision unit 65' contains a comparison circuit 93 for the comparison of the score s of the command which has been recognized, which score is delivered by the command receiving unit 64 and is presented at the input 97 of the decision unit 65'. In the comparison circuit 93 the score s is compared with the threshold values x, y and z, assuming that the switches 98' and 98" are in the position shown in the drawing.

If the score falls between 0 and x %—the program in FIG. 3 then runs from block 56 via the branch 34 back to the block 31—then in FIG. 6 the comparison circuit 93 gives a signal over the line 68.1 to block 88 of the activation unit 66, so that the following is passed on via the loudspeaker 62 (see block 35 in FIG. 3):

"Your command has not been recognized. I shall repeat the question."

Since the line 68.1 also runs to the central control unit 82 this initiates via line 83 a repetition of the question by the question unit 60 (block 31 in FIG. 3).

If the score falls between x and y %—the program in FIG. 3 now runs on from block 56 via the branch 49'— then the comparison circuit 93 gives a signal over the line 68.2 to the block 88 of the activation unit 66, so that the following question is asked via the loudspeaker 62 (see block 50' in FIG. 3):

"Did you give—. . . —as a command?"

Since the line 68.2 is also coupled to the central unit 82 the command recognition unit 63' can then be switched on by the central unit 82 via the line 84 for the recognition of an affirmative or negative answer (block 51' in FIG. 3). This recognition takes place in a circuit 95. If a negative answer is recognized (and the program of FIG. 3 continues running via blocks 40, 53 and 43) then a signal is generated on the line 68.5 that is supplied via the OR gate 91 to the counter 75, so that the counter status is raised by one. We assume that m has remained equal to or is lower than v. The signal at the output 68.5 of the command recognition unit 63' is supplied via the OR gate 91 and the line 89 to the central unit 82 which activates the activation unit 60 via the line 83 to repeat the question (block 31 in FIG. 3). If an affirmative answer is recognized in the circuit 95 then the circuit 95 delivers a signal to the output 68.6. This output is coupled to the central unit 82. The central unit 82 next gives a control signal via the line 83 to the activation unit 60 so that the next question is asked (block 36 in FIG. 3).

If the score falls between y and z %—the program in FIG. 3 now runs on from block 56 via branch 49—then the comparison circuit 93 gives a signal over the line 68.3 which activates the command status 88 in the activation unit 66 to produce the reaction (see block 50 of FIG. 3).

"The command—. . . —has been recognized."

Since the line 68.3 is also coupled to the central unit 82, this unit, after the occurrence of the signal on the line 68.3, can switch on the protest recognition unit 72 via a control signal over the line 85 for the detection of a protest (if there is one) (see block 51 in FIG. 3). If a protest is detected by unit 72, there then appears at output 73 thereof a signal that is supplied via the OR gate 91 to the counter input 74 of the counter 75, as a result of which the content of this counter is raised by one (see branch 52 in FIG. 3). In addition, a control signal is again given via line 89 to the central unit 82 on the basis of which the central unit 82 delivers a control signal via the line 83 to the question unit 60 and the question is repeated (block 31 in FIG. 3). If no protest is detected, the central unit 82 delivers a control signal via the line 83 to the question unit 60, after which unit 60 asks the next question (block 36 in FIG. 3). In the above it has still been assumed that m≦v.

If the score falls between z and 100%—the program in FIG. 3 then runs via branch 57—a signal is presented via line 68.4 by the comparison circuit 93 to the input 67 of the activation unit 66, on the basis of which the question unit 60 therein is activated to ask the next question (block 36 in FIG. 3).

After the next question is asked the protest recognition unit 72 and the command recognition unit 63' are again switched on either simultaneously or one after the other (see blocks 37 and 38 in FIG. 3). If a protest is detected then the program runs on further here via branch 39. The unit 72 again delivers a counter pulse to the counter 75 and (via the counter input 89) to the central unit 82, so that the latter supplies a control signal over the line 83 to the question unit 60 and this unit again asks the second-last question (block 31 in FIG. 3, which is reached via branches 39, 42 and 44).

Let us now assume that after a counter pulse is supplied to the counter 75 the content m of the counter then exceeds the value v. The result of this is that the comparison circuit 78 supplies a signal via the line 86 to the decision unit 65', and in fact to a time circuit 96 in the decision unit 65'. During a time interval T after the occurrence of the signal from the comparator 78 this time circuit delivers a control signal to the switches 98' and 98" as a result of which these move into a different position from that shown in the drawing during this time interval. The scores y' and z' are now supplied to the comparison circuit 93 as threshold values (see also FIG. 4b). As can be seen from FIG. 4, the scores y' and z' are greater than the score y or z, respectively.

After the time interval T, the switches 98' and 98", return to the position shown in the drawing, provided a control signal from the comparator 78 is not detected again. For this purpose, the time circuit 96 also comprises a detection circuit which detects whether a signal has come in again from the comparator 78 within the time interval T.

If that is the case, the time circuit 96 begins to run through the time interval T again at that moment. The interval during which the switches 98' and 98" are in a position other than that shown in the drawing is therefore extended.

In addition, after each occurrence of the control signal on the line 86, a control signal is sent by the central unit 82 via the line 87 to the counter 75, as a result of which this is reset to zero.

Figure 6A:
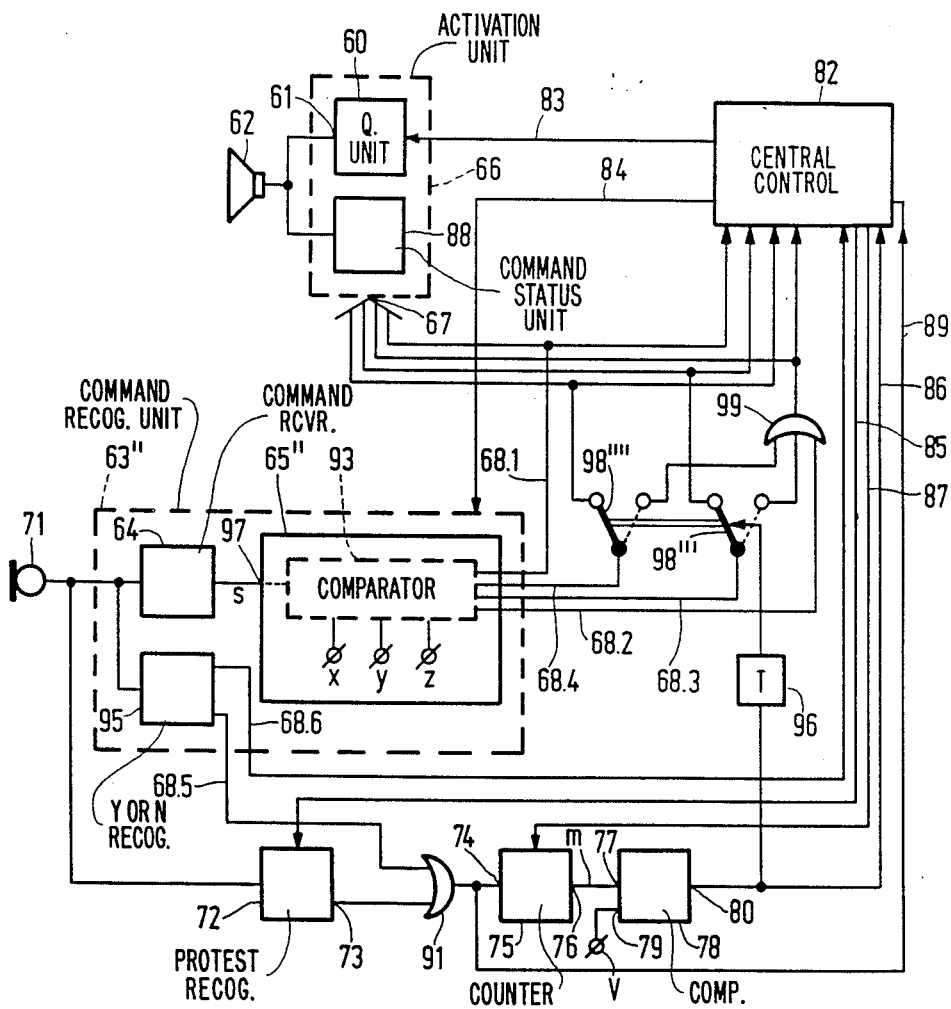

FIG. 6A shows an interactive system for the realization of the other method described above on the basis of FIG. 3. Here, after the value v has been exceeded, only the reaction in accordance with branch 49' (see FIG. 3) is given as the reaction after a recognition of a command by the system. The circuit in FIG. 6A displays a great deal of agreement with that of FIG. 6. The only changes are the decision unit 65' from FIG. 6 (now decision unit 65") and the connections 68.2 to 68.4 inclusive between the outputs of the comparison circuit 93 and the central unit 82 and the activation unit 66. These connections incorporate, respectively, an OR gate 99 and the switches 98''' and 98''''. The switches 98''' and 98'''' are driven by the output signal of the time circuit 96. If the value v has not yet been exceeded then the output signal from the time circuit 96 is such that the switches 98''' and 98'''' are in the position shown in the drawing. The circuit now operates as already described on the basis of the circuit in FIG. 6. If m exceeds the value v, then in the time interval T after this the output signal of the time circuit 96 becomes such that the switches move to a position different from that shown in the drawing.

This means that also in the cases where the score of a command that has been recognized lies between y and z, or between z and 100%, respectively, the signals on the lines 68.3 and 68.4, via the OR gate 99, bring about a reaction in the activation unit 66 in accordance with the branch 49' in FIG. 3.

For the recognition of commands, the command recognition unit 63" has a reference pattern for each command which is stored in a memory comprised in such unit. Each command supplied to the system by the user is processed by the command recognition unit and compared with the reference patterns in the memory.

If there is a sufficient degree of agreement between the command and a certain reference pattern, then it is decided that the command pertaining to the reference pattern is recognized.

The sequence in which the reference patterns are successively compared with the commands supplied by the user can be advantageously chosen in such a way that the recognition procedure (in general) lasts for as short a time as possible, so that the intercommunication between the user and the system also takes place as quickly as possible.

For preference, therefore, the sequence of comparison will be chosen in such a way that the reference pattern of the command that has the highest possibility of occurring is first compared with the command supplied and that subsequently in each case the reference patterns of those commands of the remaining commands which have the greatest probability of occurring are compared with the command supplied.

In the example shown in FIG. 2 discussed above, in which the question is asked in block 31 as to whether the user/traveller wants to go to Amsterdam, Rotterdam of Utrecht, it may be expected that, if the system, for example, is installed in Haarlem most users will want to have a ticket to Amsterdam, a smaller number will want to go to Rotterdam and an even smaller number to Utrecht. The command supplied by the user/traveller will therefore first be compared with the reference pattern stored in the system corresponding to "Amsterdam", only after that with the one for "Rotterdam", and if no recognition has taken place in both cases, with the reference pattern corresponding to "Utrecht".

The interactive system as described in FIGS. 5, 5A, 6 or 6A can be coupled to the telephone network. The system is then an "information retrieval" system, with the aid of which information can be obtained via the telephone network in any arbitrary fields by an interchange of questions and answers.

It is, of course, self-evident that the methods and systems described can be supplemented by the features described in the Dutch Patent Application No. 84 01 863 published Jan. 2, 1986, and assigned to the assignee of Applicants' priority Dutch application. In such Application No. 8401863 it is proposed that in order to speed up the dialogue between a practised user and the interactive system, the user should be given the opportunity to interrupt the issue of information by the system, as a result of which parts of the dialogue can then be skipped.

TABLE

| Block number | Legends in the blocks — Legend |
|---|---|
| FIG. 1 | |
| 10 | start |
| 11 | 1st question |
| 12 | 1st command |
| 13, 13', 13", 13''' | decision model |
| 15 | no command recognized |
| 16 | 2nd question |
| 17 | 2nd command |
| 18 | 3rd question |
| 19 | 3rd command |
| 20 | 4th question |
| 21 | 4th command |
| 22 | the price is . . . |
| 23 | payment |
| 24 | ticket |
| 25 | stop |
| FIGS. 2, 2A and 3 | |
| 31 | nth question |
| 32 | nth command |
| 33, 33', 56 | decision model |
| 35 | no command recognized |
| 36 | (n + 1)th question |
| 37, 51 | protest? |

TABLE-continued

| Block number | Legends in the blocks — Legend |
|---|---|
| 38 | (n + 1)th command |
| 40 | increase counter by 1 |
| 41, 48, 53 | information given to the user |
| 43 | does m exceed v? |
| 46 | set counter to zero |
| 47 | adapt decision model |
| 50 | the command . . . has been recognized |
| 50' | did you issue the command - . . . -? |
| 51' | confirmation? |

What is claimed is:

1. A method of carrying out successive sections of a program of operation of a user interactive system in accordance with successive verbal commands given by the user in response to successive verbal questions presented to the user by the system, each such question corresponding to a respective program section, said method comprising the steps of:
    (a) presentation by the system to the user of a verbal question corresponding to a program section,
    (b) in response to such question, the user gives a verbal command which is recognized by a command recognition unit comprised in the system,
    (c) evaluation of the recognized command by the command recognition unit in accordance with a decision model therein, and selection on the basis of such evaluation of one verbal reaction from a group of at least two possible verbal reactions of the system to the recognized command,
    (d) presentation by the system to the user of the chosen verbal system reaction, and
    (e) repetition of steps (a) and (d) for succeeding program sections:
    such method being characterized in that:
    (f) a protest is given to the system by the user each time the user perceives that the system reaction given in step (d) of an existing program section is inconsistent with a user command given in step (b),
    (g) the number of protests ('protest score') is counted by the system at least during each program section, and
    (h) when the protest score exceeds a predetermined level of at least two protests the decision model initiates a time interval (T), which continues for a plurality of succeeding user commands, during which interval the decision model chooses another verbal reaction from said group of possible verbal reactions of the system in response to one or more of the user commands recognized during said interval (T), such other verbal reaction including verbal identification of such commands as recognized by the command recognition unit.

2. A method as claimed in claim 1, wherein step (c) comprises:
    evaluation of a recognized command by said command recognition unit by calculation of a command recognition score which indicates the reliability that such recognized command was a command given by the user;
    comparison by a decision unit comprised in said system of the recognition score of a recognized command with a threshold value such that, if the recognition score exceeds said threshold value the chosen verbal system reaction is to immediately present the user a following question, and if the recognition score is below said threshold value the chosen verbal system reaction is to give the user verbal identification of said recognized command; and if said protest score exceeds said predetermined level of at least two protests, said threshold level of said recognition score is increased at least during said time interval (T).

3. A method as claimed in claim 1, characterized in that if said protest score exceeds said predetermined level of at least two protests, then during said time interval (T) the chosen system verbal reaction is to give the user information describing each command recognized by said command recognition unit.

4. A method as claimed in claim 3, characterized in that in response to a user protest the system presents the user with a verbal question whether the command recognized by the command recognition unit is also the command which had been given by the user.

5. A method as claimed in claim 4, characterized in that said command recognition unit recognizes an affirmative or negative answer by the user to the question presented by the system in response to a user protest.

6. A method as claimed in claim 1, characterized in that if during said time interval (T) the number of protests again reaches a level which exceeds said predetermined level the duration of said time interval (T) is extended.

7. A user interactive system for carrying out successive sections of a program in accordance with successive verbal commands given by the user in response to successive verbal questions presented to the user by the system, such system comprising:

an activation unit including a question unit for presenting verbal questions to the user and a command status unit for presenting to the user a verbal system reaction in response to each user command;

a command recognition unit for recognizing each user command;

a decision unit comprised in said command recognition unit for evaluating the reliability of recognition of each user command, and on the basis of such evaluation selecting one verbal reaction from a group of at least two possible verbal reactions of the system to such user command, the chosen system reaction being in accordance with a predetermined decision model;

a protest recognition unit for receiving a protest from the user each time the user perceives that the system reaction given in response to a user command is inconsistent with such command;

a counter coupled to the protest recognition unit for counting the number of user protests ('protest score') at least during each program section; and a comparison circuit coupled to said counter for comparing the protest score of said counter with a predetermined level of at least two protests and supplying a control signal to said decision unit if said protest score exceeds said predetermined level; said control signal causing said decision unit to initiate a time interval (T) during which interval said decision unit chooses another verbal reaction from said group of possible verbal reactions of said system in response to one or more user commands recognized by said command recognition unit during said time interval (T), said other verbal system reaction being presented to the user by said command status unit and including information describing such recognized commands.

8. A system in accordance with claim 7, characterized in that during an existing program section the command recognition unit compares each recognized user command with a reference pattern stored therein of possible user commands relating to such program section; the sequence in which the recognized command is so compared being in accordance with a sequence of probabilities of occurrence of such stored commands during the existing program step, the command in said pattern having the highest probability of occurrence being first compared with the recognized command.

9. A user interactive system as claimed in claim 7, characterized in that at least during said time interval (T) following said control signal said decision unit causes said activation unit to give the user, in response to user commands, a system verbal reaction which identifies one or more of such commands as recognized by said command recognition unit.

10. A user interactive system as claimed in claim 9, characterized in that if a user protest is received by said protest recognition unit in response to identification of a recognized command, said question unit questions the user whether the recognized command was a command which had been given by the user and said command recognition unit is adapted to recognize whether the user gives an affirmative or negative answer to such question.

11. A user interactive system as claimed in claim 7, characterized in that said decision unit comprises a detection unit for detecting whether another control signal is produced by said comparison circuit within said time interval (T) following production of a prior control signal, and if so said decision unit is adapted to extend said time interval (T).

* * * * *